United States Patent
Geng et al.

(10) Patent No.: US 9,603,063 B2
(45) Date of Patent: Mar. 21, 2017

(54) COMMUNICATIONS METHOD, DEVICE, AND SYSTEM

(71) Applicant: HUAWEI TECHNOLOGIES CO., LTD., Shenzhen, Guangdong (CN)

(72) Inventors: Tingting Geng, Shanghai (CN); Wei Zhang, Shanghai (CN); Shunqing Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 14/141,001

(22) Filed: Dec. 26, 2013

(65) Prior Publication Data

US 2014/0106759 A1  Apr. 17, 2014

Related U.S. Application Data

(63) Continuation of application No. PCT/CN2012/078060, filed on Jul. 2, 2012.

(30) Foreign Application Priority Data

Jul. 1, 2011 (CN) .......................... 2011 1 0184339
Nov. 4, 2011 (CN) .......................... 2011 1 0347747

(51) Int. Cl.
  *H04W 36/00* (2009.01)
  *H04W 36/04* (2009.01)
  (Continued)

(52) U.S. Cl.
  CPC ....... *H04W 36/0055* (2013.01); *H04W 36/04* (2013.01); *H04W 36/38* (2013.01); *H04W 84/045* (2013.01); *Y02B 60/50* (2013.01)

(58) Field of Classification Search
  CPC ... H04W 36/04; H04W 84/045; H04W 48/12; H04W 36/0055; H04W 36/38; Y02B 60/50
  See application file for complete search history.

(56) References Cited

U.S. PATENT DOCUMENTS 6,081,719 A  6/2000 Picha et al.
2002/0147008 A1*  10/2002 Kallio ................... H04W 36/14
                                                                  455/426.1
(Continued)

FOREIGN PATENT DOCUMENTS

CN         1611089      4/2005
CN       101472317 A    7/2009
(Continued)

OTHER PUBLICATIONS

International Search Report issued Oct. 18, 2012, in corresponding International Patent Application No. PCT/CN2012/078060.
(Continued)

*Primary Examiner* — Dinh P Nguyen
(74) *Attorney, Agent, or Firm* — Staas & Halsey LLP

(57) ABSTRACT

Embodiments of the present invention provide a communications method, device, and system. The method includes: monitoring whether a terminal on a macro network has a service requirement on a micro network, where the micro network is in the coverage area of the macro network, and all common physical channels or some common physical channels except a pilot channel on the micro network are in a disabled state; and if the terminal has a service requirement on the micro network, sending a network handover instruction that includes configuration information of the micro network to the terminal, where the network handover instruction is used to instruct the terminal to hand over from the macro network to the micro network. In the embodiments of the present invention, power consumption of a capacity station is reduced, and unnecessary power waste is reduced.

13 Claims, 5 Drawing Sheets

(51) Int. Cl.
*H04W 36/38* (2009.01)
*H04W 84/04* (2009.01)

(56) References Cited

U.S. PATENT DOCUMENTS

| | | |
|---|---|---|
| 2004/0202135 A1 | 10/2004 | Han et al. |
| 2005/0130644 A1 | 6/2005 | Bassompierre et al. |
| 2005/0250504 A1* | 11/2005 | Mikola ................ H04W 8/183 455/450 |
| 2005/0250529 A1* | 11/2005 | Funnell ................ H04W 36/24 455/525 |
| 2009/0285143 A1 | 11/2009 | Kwun et al. |
| 2010/0002614 A1 | 1/2010 | Subrahmanya |
| 2010/0048212 A1* | 2/2010 | Yavuz ................ H04W 52/244 455/436 |
| 2010/0234039 A1 | 9/2010 | Kwon et al. |
| 2010/0242103 A1* | 9/2010 | Richardson ....... H04W 36/0061 726/7 |
| 2010/0329182 A1* | 12/2010 | Wigard ................ H04W 48/10 370/328 |
| 2011/0014921 A1* | 1/2011 | Neil ..................... H04W 48/08 455/444 |

FOREIGN PATENT DOCUMENTS

| | | |
|---|---|---|
| CN | 101686580 A | 3/2010 |
| CN | 101815247 A | 8/2010 |
| CN | 101848503 A | 9/2010 |
| EP | 2 056 628 A1 | 5/2009 |
| EP | 2 323 426 A1 | 5/2011 |
| WO | 2011/005019 A2 | 1/2011 |

OTHER PUBLICATIONS

International Search Report, dated Oct. 18, 2012, in corresponding International Application No. PCT/CN2012/078060 (8 pp.).

Chinese Office Action issued on Jun. 27, 2014 in corresponding Chinese Patent Application No. 201110347747.0.

Extended European Search Report issued May 9, 2014, in corresponding European Patent Application No. 12808136.1.

Chinese Office Action dated Oct. 26, 2015 in corresponding Chinese Patent Application No. 201110347747.0, 9 pages.

* cited by examiner

A network-side communications device on a macro network monitors whether a terminal on the macro network has a service requirement on a micro network, where the micro network is in the coverage area of the macro network, and all common physical channels or some common physical channels except a pilot channel on the micro network are in a disabled state ~11

If the terminal has a service requirement on the micro network, the network-side communications device sends a network handover instruction that includes configuration information of the micro network to the terminal, where the network handover instruction is used to instruct the terminal to hand over from the macro network to the micro network ~12

FIG. 1

A network-side communications device on a macro network monitors whether a terminal on a micro network has a service requirement on the micro network, where the micro network is in the coverage area of the macro network, and all common physical channels or some common physical channels except a pilot channel on the micro network are in a disabled state ~21

If the terminal does not have a service requirement on the micro network, the network-side communications device sends a network handover instruction to the terminal or sends a state transition indication to the terminal, where the network handover instruction is used to instruct the terminal to hand over to the macro network, and the state transition instruction is used to instruct the terminal to transit to a state of occupying no dedicated channel ~22

FIG. 2

COMMUNICATIONS METHOD, DEVICE, AND SYSTEM

CROSS-REFERENCE TO RELATED APPLICATIONS

This application is a continuation of International Application No. PCT/CN2012/078060, filed on Jul. 2, 2012, which claims priority to Chinese Patent Application No. 201110184339.8, filed on Jul. 1, 2011 and Chinese Patent Application No. 201110347747.0, filed on Nov. 4, 2011, all of which are hereby incorporated by reference in their entireties.

TECHNICAL FIELD

Embodiments of the present invention relate to communications technologies, and in particular, to a communications method, device, and system.

BACKGROUND

Base stations include a macro base station (Macro Base station, Macro BS for short) with higher transmit power and a capacity station with lower transmit power. Installing a capacity station indoors is a solution to extend indoor radio coverage of mobile communications. A main function is to improve indoor coverage, provide a higher service rate for a user, and reduce costs required for a high-rate service, so that the user is capable of accessing a core network through the capacity station by using various mobile terminal devices.

On an existing radio communications system, a terminal acquires required parameters, such as a cell selection/reselection parameter and a channel configuration parameter, through system messages broadcast by a base station. However, considerable radio resources need to be occupied to broadcast the system messages. For example, on a UMTS (Universal Mobile Telecommunications System), a system message is broadcast periodically, and the system message is transmitted at the maximum power all the time so as to ensure coverage. In the prior art, a method for acquiring a system message is provided as follows: When a system message change label included in a system information block sent by a base station indicates that the system message changes, a terminal acquires an updated system message.

However, in the method for acquiring a system message, when the system message of a capacity station frequently changes, considerable signaling overhead is still required when the method is used so as to frequently send a MIB (Master Information Block) and the updated system message, which increases power consumption of the capacity station.

SUMMARY

The present invention provides a communications method, device, and system, which reduce power consumption of a capacity station and reduce energy waste.

An aspect of the present invention provides a communications method, including: monitoring whether a terminal on a macro network has a service requirement on a micro network, where the micro network is in the coverage area of the macro network, and all common physical channels or some common physical channels except a pilot channel on the micro network are in a disabled state; and if the terminal has a service requirement on the micro network, sending a network handover instruction that includes configuration information of the micro network to the terminal, where the network handover instruction is used to instruct the terminal to hand over from the macro network to the micro network.

An aspect of the present invention further provides a network-side communications device, including: a first monitoring module, configured to monitor whether a terminal on a macro network has a service requirement on a micro network, where the micro network is in the coverage area of the macro network, and all common physical channels or some common physical channels except a pilot channel on the micro network are in a disabled state; and a first handover instructing module, configured to: if the terminal has a service requirement on the micro network, send a network handover instruction that includes configuration information of the micro network to the terminal, where the network handover instruction is used to instruct the terminal to hand over from the macro network to the micro network.

An aspect of the present invention further provides a terminal, including: a first service requesting module, configured to send a service request on a macro network to a network-side communications device on the macro network, where a micro network is in the coverage area of the macro network, and all common physical channels or some common physical channels except a pilot channel on the micro network are in a disabled state; and a first handover instruction receiving module, configured to: when the network-side communications device detects that the terminal has a service requirement on the micro network, receive a network handover instruction that includes configuration information of the micro network and is sent by the network-side communications device, where the network handover instruction is used to instruct the terminal to hand over from the macro network to the micro network.

An aspect of the present invention further provides a communications system, including the preceding network-side communications device and terminal.

Another aspect of the present invention provides a communications method, including: monitoring whether a terminal on a micro network has a service requirement on the micro network, where the micro network is in the coverage area of a macro network, and all common physical channels or some common physical channels except a pilot channel on the micro network are in a disabled state; and if the terminal has no service requirement on the micro network, sending a network handover instruction to the terminal or sending a state transition instruction to the terminal, where the network handover instruction is used to instruct the terminal to hand over to the macro network, and the state transition instruction is used to instruct the terminal to transit to a state of occupying no dedicated channel.

Another aspect of the present invention further provides a network-side communications device, including: a second monitoring module, configured to monitor whether a terminal on a micro network has a service requirement on the micro network, where the micro network is in the coverage area of a macro network, and all common physical channels or some common physical channels except a pilot channel on the micro network are in a disabled state; and a second handover instructing module, configured to: if the terminal has no service requirement on the micro network, send a network handover instruction to the terminal or send a state transition instruction to the terminal, where the network handover instruction is used to instruct the terminal to hand over to the macro network, and the state transition instruction is used to instruct the terminal to transit to a state of occupying no dedicated channel.

Another aspect of the present invention further provides a terminal, including: a second service requesting module, configured to send a service request on a micro network to a network-side communications device on a macro network, where the micro network is in the coverage area of the macro network, and all common physical channels or some common physical channels except a pilot channel on the micro network are in a disabled state; and a second handover instruction receiving module, configured to: when the network-side communications device detects that the terminal on the micro network has no service requirement on the micro network, receive a network handover instruction sent by the network-side communications device or receive a state transition instruction sent by the network-side communications device, where the network handover instruction is used to instruct the terminal to hand over to the macro network for camping, and the state transition instruction is used to instruct the terminal to transit from a state of occupying a dedicated channel to a state of occupying no dedicated channel.

Still another aspect of the present invention provides a communications system, including: the network-side communications device and the terminal that are provided in the another aspect of the present invention.

Still another aspect of the present invention further provides a communications method, including: setting, by a network-side device, at least one carrier among multiple carriers to a channel tailor mode, and setting at least one carrier among the multiple carriers to a non-channel tailor mode; and performing, by the network-side device, communication on the carrier set to the channel tailor mode and on the carrier set to the non-channel tailor mode.

Still another aspect of the present invention further provides a base station, including a processing unit, configured to set at least one carrier among multiple carriers to a channel tailor mode and set at least one carrier among the multiple carriers to a non-channel tailor mode; and a communication unit, configured to perform communication on the carrier set to the channel tailor mode and on the carrier set to the non-channel tailor mode.

In the communications method, device, and system in the embodiments of the present invention, all common physical channels or some common physical channels except a pilot channel on a micro network are disabled to reduce transmission of broadcast signaling on the micro network, so as to reduce power consumption of a capacity station. In this way, the capacity station cannot support access of a terminal. The terminal accesses a macro network during initial access. When the terminal has a service requirement on the micro network, the terminal is allowed to access the micro network, and the micro network provides a service for the terminal. Because all common physical channels or some common physical channels except the pilot channel on the micro network are disabled, the capacity station provides a high-rate service for the terminal only when the terminal has a service requirement, thereby avoiding a phenomenon that the terminal is maintained when the terminal has no service requirement, avoiding overhead generated because the capacity station continuously transmits broadcast signaling, reducing power consumption of the capacity station, and reducing transmit power of the capacity station.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1 is a flowchart of a communications method according to an embodiment of the present invention;

FIG. 2 is a flowchart of another communications method according to an embodiment of the present invention;

DESCRIPTION OF EMBODIMENTS

Figure 3A:
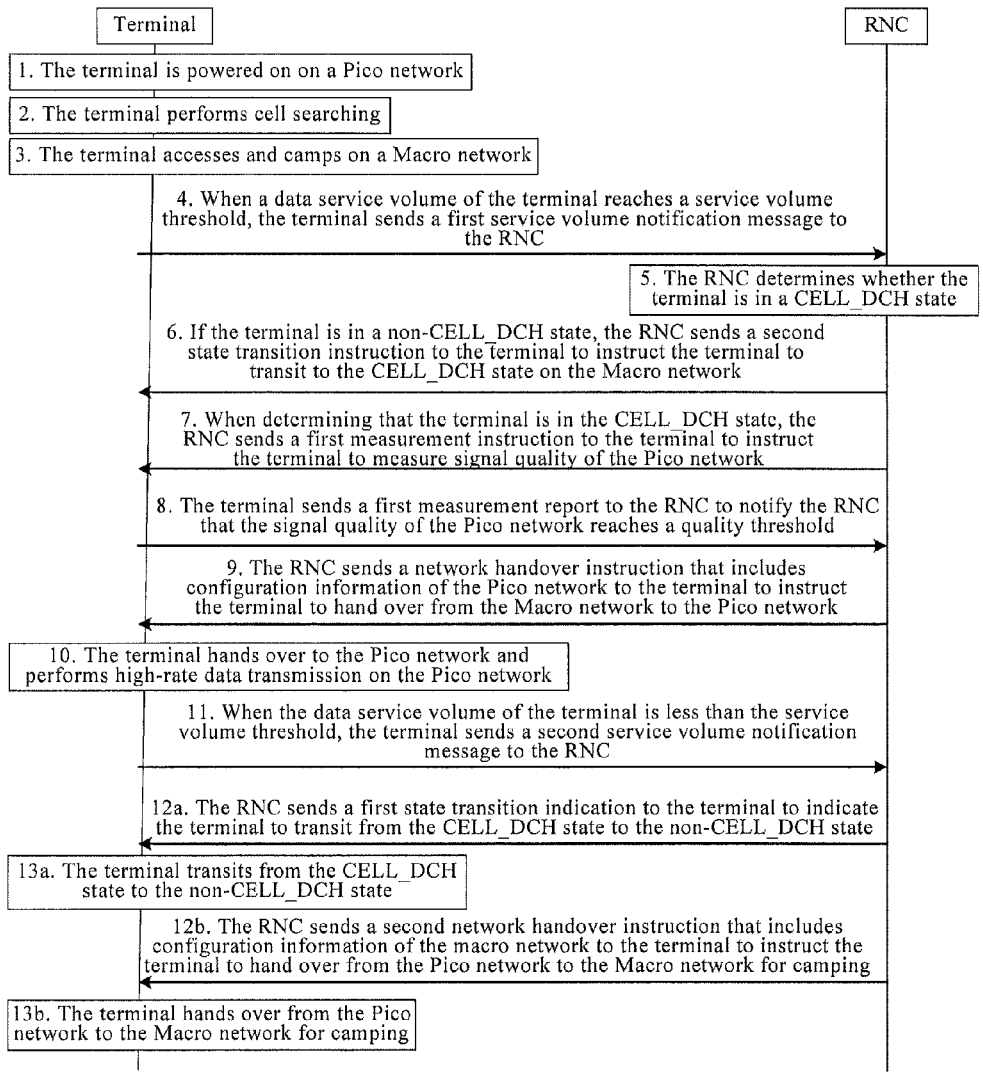
FIG. 3A is a flowchart of still another communications method according to an embodiment of the present invention.

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the embodiments of the present invention, generally, transmit power of a macro base station is greater than transmit power of a capacity station, and the coverage area of the macro station may also be greater than the coverage area of the capacity station. The capacity station may also be called a small cell or may be called a low power node (Low Power Node, LPN). There may be various types of capacity stations, such as a home base station (Home NodeB, HNB for short), a micro base station (Micro Base Station, Micro BS for short), a pico base station (Pico Base Station, Pico BS for short), a femtocell (FemtoCell, or Femto Base Station), and a home evolved base station (Home evolved Node B, HeNB). Network systems of different modes may include both the macro base station and the capacity station. In the embodiments of the present invention, a network covered by the macro base station may be called a macro network, and a network covered by the capacity station may be called a micro network. The capacity station may be located in the coverage area of the macro network, and the capacity station may be controlled by the macro base station. The coverage area of the micro network may be in the coverage of the macro network.

On an existing radio communications system, considerable radio resources need to be occupied to broadcast a system message. For example, on a UMTS system, a system message is broadcast periodically, and the system message is transmitted at the maximum power all the time so as to ensure coverage. On a frequency division duplexing (Frequency Division Duplexing, FDD for short) UMTS network, a dedicated channel is allocated for a terminal in a CELL_DCH state so that the terminal is capable of performing high-rate data transmission, and the terminal in the CELL_DCH state does not need to read the system message. A capacity station has the following features: The number of users is small and fixed, a network situation changes slowly, and when a problem of insufficient coverage is solved, a high-rate service can be provided. Therefore, when a micro network controlled by the macro base station exists in the coverage area of the macro network, the macro network provide sufficient effective coverage. In this case, flexible configuration can be performed based on a network feature and from the perspective of requirements on resource utilization efficiency, quality of service (QoS) of a user, and green and energy conservation, so that, when having no service, the terminal is capable of camping on the macro network covered by the macro base station; and the capacity station only needs to maintain the terminal in the CELL_DCH state that has a large service volume to perform high-rate data transmission, and only needs to maintain radio resources of the terminal in the CELL_DCH state.

The terminal in the embodiments of the present invention may be a single-mode terminal or may be a dual-mode terminal. A network-side communications device in the embodiments of the present invention may be a network-side communications device controlling the macro base station on the macro network, and the network-side communications device may be integrated with the macro base station in a hardware device.

FIG. 1 is a flowchart of a communications method according to an embodiment of the present invention. As shown in FIG. 1, the method in this embodiment includes:

Step 11: A network-side communications device on a macro network monitors whether a terminal on the macro network has a service requirement on a micro network, where the micro network is in the coverage area of the macro network, and all common physical channels or some common physical channels except a pilot channel on the micro network are in a disabled state.

The terminal on the macro network refers to that the terminal accessing and camping on the macro network. In a capacity station of the embodiment of the present invention, all common physical channels or some common physical channels except the pilot channel on the micro network may be disabled. This can reduce transmission overhead of broadcast signaling on the capacity station and reduces transmit power of the capacity station, so that interference between neighboring cells can be reduced and uplink and downlink capacity gains can be obtained. In the embodiment of the present invention, disabling some channels or all channels may be called channel tailoring, and when some channels or all channels on a network are in a disabled state, it may be called that the network is in a channel tailor mode. For example, after common physical channels except the pilot channel on the micro network are disabled, it may be called that the micro network is in the channel tailor mode. After the micro network is in the channel tailor mode, it does not support initial access of a terminal and camping of a terminal in an idle state and further does not support cell reselection of a terminal that occupies no dedicated channel, where the target of the cell reselection is the capacity station. Because the micro network cannot support the initial access of the terminal, a terminal that is newly powered on cannot camp on the micro network even if the micro network has good signal quality. In this way, after the micro network is in the channel tailor mode, in a situation that a macro base station cell and the micro network overlap in coverage, the terminal is only capable of camping on the macro network and initiates data services on the macro network, such as a paging service and a transmission service. The pilot channel on the micro network is in an enabled state and provides a measurement service of signal quality of the micro network for the terminal.

For example, on a third generation (3rd generation, 3G) communications network, such as a UMTS network, states of the terminal may include a CELL_DCH state and a non-CELL_DCH state, where the non-CELL_DCH state includes states such as idle, URA_PCH, CELL_PCH, and CELL_FACH. In the embodiment of the present invention, for the CELL_DCH state, the non-CELL_DCH state, the states such as idle, the URA_PCH, the CELL_PCH, and the CELL_FACH, reference may be made to description in 3GPP standards. On a 3G network, after the micro network is in the channel tailor mode, it cannot maintain a terminal in the non-CELL_DCH state. A dedicated physical channel and a dedicated transmission channel are allocated for a terminal in the CELL_DCH state. If the terminal transmits data in the dedicated channel, it does not need to randomly access the 3G network and does not need to read a system message. Therefore, after the micro network is in the channel tailor mode, a data service of the terminal in the CELL_DCH state is not affected. Therefore, the micro network is capable of maintaining the terminal in the CELL_DCH state.

For example, states of a terminal on a second generation (2nd generation, 2G) network or a fourth generation (4th generation, 4G) network include a connected state and a disconnected state. On the 2G network or the 4G network, after some common physical channels are disabled on the micro network for a terminal in the disconnected state so that the micro network enters the channel tailor mode, the micro network does not support random access of the terminal, does not send the system message, and cannot maintain the terminal in the disconnected state. However, the micro network is capable of maintaining a terminal in the connected state. In the embodiment of the present invention, for division of a network of 2G, 3G, 4G, or a higher-level network technology type, persons skilled in the art may determine the division according to a consensus and experience in the communication industry.

Step 12: If the terminal has a service requirement on the micro network, the network-side communications device sends a network handover instruction that includes configuration information of the micro network to the terminal, where the network handover instruction is used to instruct the terminal to hand over from the macro network to the micro network.

After being powered on, the terminal camps on the macro network and sends a service request on the macro network to the macro base station. The capacity station does not maintain the terminal when the terminal has no service requirement. When the network-side communications device detects that the terminal on the macro network has a service requirement on the micro network, the terminal is triggered to hand over to the micro network, and the capacity station provides a service for the terminal. For example, on the 2G network, a base station controller (Base Station Controller, BSC for short) may monitor whether the terminal has a service requirement on the micro network. When the terminal has a service requirement on the micro network, the BSC sends a network handover instruction that includes configuration information of the micro network to the terminal. On the 3G network, a radio network controller (Radio Network Controller, RNC for short) may monitor whether the terminal has a service requirement on the micro network. On a Long Term Evolution (Long Term Evolution, LTE) network system or an LTE Advanced (LTE Advanced, LTE-A) network system, an evolved base station (evolved NodeB, eNB) may monitor the terminal. When the terminal has a service requirement on the micro network, the network-side communications device on the macro network sends the network handover instruction that includes the configuration information of the micro network to the terminal. After the terminal hands over to the micro network, high-rate data transmission may be performed through a dedicated channel provided by the capacity station.

In the embodiment of the present invention, there may be multiple methods for monitoring whether the terminal on the macro network has a service requirement on the micro network, which are described by using examples in the following:

An implementation manner is as follows: The network-side communications device on the macro network monitors whether a data service volume of the terminal reaches a service volume threshold. When the data service volume of the terminal reaches the service volume threshold, the network handover instruction that includes the configuration information of the micro network is sent to the terminal. The service volume threshold may be determined according to an actual communication condition and communication requirement or may be determined according to experience of persons skilled in the art. For example, on the 3G network, the RNC monitors whether the data service volume of the terminal reaches the service volume threshold. When the service volume of the terminal reaches the service volume threshold, the RNC determines that the terminal has a service requirement on the micro network. The service volume threshold may be a service volume threshold when the terminal transits from the non-CELL_DCH state to the CELL_DCH state on the 3G network.

Another implementation manner is as follows: The network-side communications device on the macro network monitors whether a service volume notification message of the terminal is received. The service volume notification message is used to notify the network-side communications device on the macro network that the data service volume of the terminal reaches the service volume threshold. When the service volume notification message of the terminal is received, the network-side communications device sends the network handover instruction that includes the configuration information of the micro network to the terminal. The service volume threshold may be determined according to an actual communication condition and communication requirement or may be determined according to experience of persons skilled in the art. For example, on the 3G network, a network handover request is carried when the terminal sends a service request to the RNC to request a handover to the micro network. When detecting that the service request of the terminal carries the network handover request, the RNC determines that the terminal has a service requirement on the micro network.

Still another implementation manner is as follows: The network-side communications device on the macro network monitors whether a network handover request exists in a service request sent by the terminal, where the network handover request is used to request a handover to the micro network. When the service request of the terminal includes the network handover request, the network-side communications device sends the network handover instruction that includes the configuration information of the micro network to the terminal. After accessing the micro network, the terminal performs high-rate data transmission in the dedicated channel. For example, on the 3G network, the terminal monitors its own service volume. When the data service volume reaches the service volume threshold, the terminal sends the service volume notification message to the RNC. After receiving the service volume notification message, the RNC determines that the terminal has a service requirement on the micro network.

In addition, the network-side communications device on the macro network may allow the terminal to hand over from the macro network to the micro network in a situation that the micro network has good signal quality. The terminal camping on the macro network measures the signal quality of the micro network through the pilot channel of the micro network, and when measuring that the signal quality of the micro network reaches a quality threshold, the terminal reports a measurement report to the network-side communications device. Because the terminal is in an overlapping coverage area of the macro network and the micro network, the signal quality of the micro network is best and reaches a preset quality threshold. When determining that the signal quality of the micro network reaches the quality threshold, the network-side communications device sends the network handover instruction that includes the configuration information of the micro network to the terminal, so as to instruct the terminal to hand over to the micro network. After accessing the micro network, the terminal performs high-rate data transmission. For example, on the UMTS network, after the terminal camping on the macro network transits to the CELL_DCH state, the terminal measures the signal quality of the micro network through the pilot channel of the micro network. The quality threshold may be determined according to an actual communication condition and communication requirement or may be determined according to experience of persons skilled in the art. When measuring that the signal quality of the micro network reaches the quality threshold, the terminal reports the measurement report to the RNC. Because the terminal is in the overlapping coverage area of the macro network and the micro network, the signal quality of the micro network is best and reaches the preset quality threshold. After the terminal camping on the macro network transits to the CELL_DCH state, when determining that the signal quality of the micro network reaches the quality threshold, the RNC sends the network handover instruction that includes the configuration information of the micro network to the terminal, so as to instruct the terminal to hand over to the CELL_DCH state of the micro network. After the terminal in the CELL_DCH state accessing the micro network, the terminal performs the high-rate data transmission in the dedicated channel.

In the embodiment of the present invention, when a micro network exists in the coverage area of a macro network, all common physical channels or some common physical channels except a pilot channel on the micro network are disabled to reduce transmission of broadcast signaling on the micro network, so as to reduce power consumption of a capacity station. In this way, the capacity station cannot support access of a terminal. The terminal accesses the macro network during initial access. When the terminal has a service requirement on the micro network, the terminal is allowed to access the micro network, and the micro network provides a service for the terminal. Because all common physical channels or some common physical channels except the pilot channel on the micro network are disabled, the capacity station provides a high-rate service for the terminal only when the terminal has a service requirement, thereby avoiding a phenomenon that the terminal is maintained when the terminal has no service requirement, avoiding overhead generated because the capacity station continuously transmits broadcast signaling, reducing power consumption of the capacity station, and reducing transmit power of the capacity station.

FIG. 2 is a flowchart of another communications method according to an embodiment of the present invention. As shown in FIG. 2, the method in this embodiment includes:

Step 21: A network-side communications device on a macro network monitors whether a terminal on a micro network has a service requirement on the micro network, where the micro network is in the coverage area of the macro network, and all common physical channels or some common physical channels except a pilot channel on the micro network are in a disabled state.

Step 22: If the terminal has no service requirement on the micro network, the network-side communications device sends a network handover instruction to the terminal or sends a state transition instruction to the terminal, where the network handover instruction is used to instruct the terminal to hand over to the macro network, and the state transition instruction is used to instruct the terminal to transit to a state of occupying no dedicated channel.

In the method of the embodiment shown in FIG. 1, after step 12, step 21 and step 22 in the embodiment shown in FIG. 2 may be further included to save radio resources of a capacity station.

The terminal on the micro network refers to the terminal accessing and camping on the micro network, and the terminal is capable of performing high-rate data transmission on the micro network by using radio resources provided by the capacity station. When detecting that the terminal on the micro network has no service requirement on the micro network, the network-side communications device on the macro network instructs the terminal to hand over to the macro network so as not to occupy the radio resources provided by the capacity station. After accessing the micro network, the terminal performs the high-rate data transmission in a dedicated channel. The terminal needs to occupy dedicated radio resources of the capacity station, but the radio resources maintained by the capacity station are limited. Therefore, whether the terminal on the micro network has a service requirement on the micro network is monitored so as to instruct the terminal to hand over to the macro network when the terminal has no service requirement on the micro network. Or, the network-side communications device on the macro network may send the state transition instruction to the terminal to instruct the terminal to transit from a state of occupying a dedicated channel to a state of occupying no dedicated channel. When a terminal in the state of occupying no dedicated channel camps on the micro network, if maintenance of the capacity station is required and the capacity station is in the channel tailor mode, the terminal may consider that the micro network has poor quality and trigger cell reselection to access the macro network for camping.

There are multiple methods for the network-side communications device on the macro network to determine whether the terminal on the micro network has a service requirement on the micro network, which are described by using examples in the following:

An implementation manner is as follows: The network-side communications device on the macro network monitors whether a data service volume of the terminal is less than a service volume threshold. When the data service volume of the terminal is less than the service volume threshold, the network-side communications device determines that the terminal has no service requirement on the micro network. For example, on a 3G network, an RNC monitors whether the data service volume of the terminal is less than the service volume threshold. When the data service volume of the terminal is less than the service volume threshold, the RNC determines that the terminal has no service requirement on the micro network. The service volume threshold may be a service volume threshold when the terminal transits from a CELL_DCH state to a non-CELL_DCH state on the 3G network.

Another implementation manner is as follows: A network handover request is carried when the terminal sends a service request to the network-side communications device on the macro network, to request a handover to the macro network. When detecting that the service request of the terminal carries the network handover request, the network-side communications device determines that the terminal has no service requirement on the micro network. For example, on the 3G network, a network handover request is carried when the terminal sends a service request to the RNC, to request a handover to the macro network. When detecting that the service request of the terminal carries the network handover request, the RNC determines that the terminal has no service requirement on the micro network.

Still another implementation manner is as follows: The terminal monitors its own service volume, and when the service volume is less than the service volume threshold, the terminal sends a service volume notification message to the network-side communications device on the macro network. After receiving the service volume notification message, the network-side communications device determines that the terminal has no service requirement on the micro network. For example, on the 3G network, the terminal monitors its own service volume, and when the service volume is less than the service volume threshold, the terminal sends the service volume notification message to the RNC. After receiving the service volume notification message, the RNC determines that the terminal has no service requirement on the micro network.

In the embodiment of the present invention, when a micro network controlled by a macro base station exists in the coverage area of a macro network and a terminal camping on the micro network has no service requirement on the micro network, a network-side communications device instructs the terminal to hand over to the macro network, so that a capacity station does not need to maintain the terminal with a less data service volume, thereby saving radio resources of the capacity station and reducing unnecessary power waste.

Figure 3B:
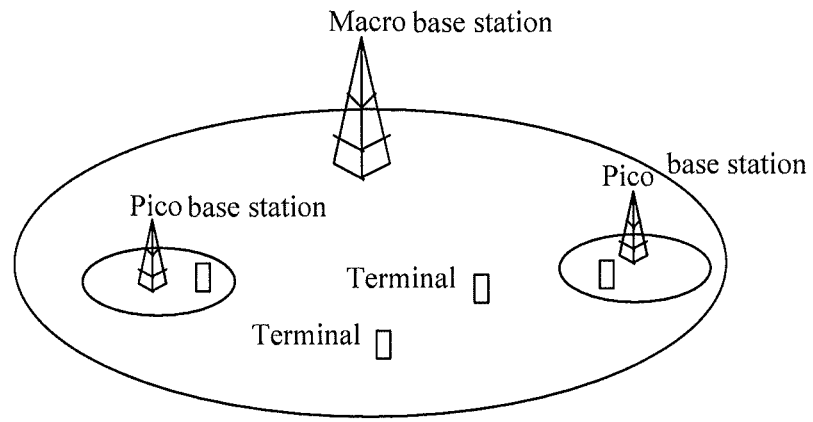
FIG. 3B is a diagram of a scenario in which a Pico network is in the coverage area of a Macro network.

FIG. 3A is a flowchart of still another communications method according to an embodiment of the present invention. FIG. 3B is a diagram of a scenario in which a Pico network is in the coverage area of a Macro network. The Macro network is a network covered by a Macro base station, the Pico network is a network covered by a Pico base station, and the Pico base station may be controlled by the Macro base station. As shown in FIG. 3B, in the coverage area of the Pico network, the Macro network and the Pico network overlap in coverage, but the coverage area of the Macro base station is wider than the coverage area of the Pico base station, and there may be multiple Pico base stations in the coverage area of the macro base station.

This embodiment mainly describes that on a UMTS network, how an RNC performs a cell handover for a dual-mode terminal on the UMTS network in a scenario in which the Pico network is in the coverage area of the Macro network. In this embodiment, a synchronization channel (Synchronization Channel, SCH for short), a common control physical channel (Common Control Physical Channel, CCPCH for short), a paging indicator channel (Paging Indicator Channel, PICH for short), an acquisition indicator channel (Acquisition Indicator Channel, AICH for short), and an uplink physical random access channel (Physical Random Access Channel, PRACH for short) on the Pico network are in a disabled state, and a common pilot channel (Common Pilot Channel, CPICH for short) is in an enabled state. The CCPCH includes a primary common control physical channel (Primary Common Control Physical Channel, P-CCPCH for short) and a secondary common control physical channel (Secondary Common Physical Channel, S-CCPCH for short), and the CPICH includes a primary paging indicator channel (Primary Paging Indicator Channel, P-CPICH for short) and a secondary paging indicator channel (Secondary Paging Indicator Channel, S-CPICH for short).

The following first describes an effect on a terminal after the UMTS common physical channels are disabled on the Pico network, that is, after the Pico network enters a channel tailor mode.

First, a main function of each disabled UMTS common physical channel is described as follows: The SCH channel mainly sends a synchronization message and is used for cell searching and cell synchronization when the terminal initially accesses the UMTS. The P-CCPCH bears a broadcast channel (Broadcast Channel, BCH for short) at a higher layer, in which mainly system messages exist. The S-CCPCH mainly bears a forward access channel (Forward Access Channel, FACH for short) and a paging channel (Paging Channel, PCH for short). The PICH is a paging indicator channel and transmits a paging indicator (Paging Indicator, PI for short). A terminal in an Idle, a URA_PCH, or a CELL_PCH state wakes up to monitor the PI on a specified paging occasion. The AICH is used to carry an acquisition indicator symbol of a network, where the indicator symbol notifies the terminal that a preamble sent through the PRACH has been detected by a system, and a PRACH message can be further sent. The PRACH channel is an uplink physical random access channel. When initiating a random access process, a terminal in a non-CELL_DCH state needs to send a preamble to a UTRAN through the PRACH and then intercepts feedback information of the network in the AICH channel. In addition, the enabled channel P-CPICH is a pilot channel, and is used to send a primary scrambling code of a cell and is a power benchmark and phase reference for other physical channels. In an FDD mode, signal strength and signal quality of a target cell are measured based on the channel through the CPICH during reselection or a handover.

Terminal states on the UMTS network are classified into an idle state, a URA_PCH state, a CELL_PCH state, a CELL_FACH state, a CELL_DCH state, and the like. In the embodiment of the present invention, the terminal states are classified into a CELL_DCH state and a non-CELL_DCH state according to different requirements of a terminal in the states on UMTS network resources, where the non-CELL_DCH state includes a state such as idle, URA_PCH, CELL_PCH, and CELL_FACH, that is, other states except the CELL_DCH state.

After the UMTS common physical channels are disabled on the Pico network, an effect on a terminal in the non-CELL_DCH state is as follows: When the SCH channel is disabled, a terminal that is newly powered on cannot synchronize with the found Pico network, and therefore the terminal cannot camp on the Pico network and continuously performs cell searching; and when the terminal detects that signal quality of the Macro network is good, it camps on the Macro network. When the PICH channel is disabled, the terminal in the non-CELL_DCH state camps on the UMTS and needs to wake up periodically at its paging occasion to intercept the PICH, so as to check whether a paging of a current group (a paging group to which the terminal belongs) exists. When the PICH channel is disabled and the terminal in the non-CELL_DCH state intercepts the PICH at the paging occasion, the terminal cannot find the PICH and therefore considers that a problem occurs on the Pico network and triggers cell reselection. When the CCPCH channel is disabled, the P-CCPCH bears system information, and the terminal in the non-CELL_DCH state needs to read the system information. There are two main reading manners: one is that the system message is automatically re-read when the system message is changed, and the other is that the system message is automatically re-read after the system message stored in the terminal expires. After the CCPCH is disabled, the terminal cannot obtain the system message, considers that a cell is a barred cell (barred cell), and triggers the cell reselection. Therefore, when the SCH/CCPCH/PICH/AICH is disabled and the Pico network enters the channel tailor mode, a corresponding effect may be exerted on behaviors such as initial access to the Pico network, cell camping, measurement, a handover, and service initiating of the terminal.

For a terminal in the CELL_DCH state, a dedicated physical channel, a dedicated transmission channel, and a dedicated logical channel are allocated for the terminal. The dedicated logical channel may be a dedicated control channel (Dedicated Control Channel, DCCH for short) and a dedicated traffic channel (Dedicated Traffic Channel, DTCH for short). When the terminal performs data transmission in the dedicated transmission channel, it does not need to randomly access and does not need to intercept the AICH to listen to an acquisition indicator (Acquisition Indicator, AI for short). The terminal does not need to read the system message. When configuration information of a camping cell changes, an RNC delivers kinds of configuration or bearing signaling in turn through a dedicated channel and finally configures network resources for the terminal. If the UTRAN needs to page the terminal in the CELL_DCH state, the UTRAN sends Paging Type2 information (where the Paging Type2 information is used to page the terminal in the CELL_DCH state) to the terminal through the DCCH, the dedicated channel (Dedicated Channel, DCH for short), and a dedicated physical data channel (Dedicated Physical Data Channel, DPDCH for short) and does not need to intercept the PICH and the CCPCH. Therefore, after a Pico cell enters the channel tailor mode, there is no effect on service receiving and sending by the terminal in the CELL_DCH state. If the terminal in the CELL_DCH state loses synchronization in a serving cell, it changes to the CELL_FACH state. As can be known from the preceding analysis, after the Pico network enters the channel tailor mode, the terminal in the non-CELL_DCH state cannot be maintained, and therefore the terminal reselects the Macro network.

Regardless of whether the Pico network is in the channel tailor mode, the CPICH channel is normally enabled. When it is necessary to measure signal quality of a cell, only support of the P-CPICH channel is required to complete the measurement. For an aspect of mobility of the terminal in the CELL_DCH state, a soft/hard handover between Pico networks is first considered. Before a handover is performed, the terminal needs to measure signal quality of a target cell. The UTRAN delivers a measurement control (Measurement Control) message in the DCCH to the terminal in the CELL_DCH state. Regardless of whether the target cell is in the channel tailor mode, the CPICH channel is normally enabled. To complete the soft/hard handover, the terminal in the CELL_DCH state only needs the support of the P-CPICH channel to complete related measurement of the target cell. Network configuration information of the target cell is sent by the RNC to the terminal in the CELL_DCH state that needs to perform the handover. After receiving the configuration information of the target cell, the terminal may perform the handover directly. Support of other physical channels in the target cell is not required in the whole process. Therefore, no matter in a source cell or the target cell of the handover, a handover behavior of the terminal is not affected as long as the CPICH channel is enabled and the CPICH channel is capable of providing measurement support for the terminal in the CELL_DCH state.

As shown in FIG. 3A, the method in this embodiment includes:

Step 1: The terminal on the Pico network is powered on.

Step 2: The terminal performs cell searching.

Step 3: The terminal accesses and camps on the Macro network.

When the Pico network is in the coverage area of the Macro network, the Macro network and the Pico network are configured as a neighboring cell of each other, and the Pico base station disables the SCH, CCPCH, PICH, AICH, and PRACH channels, and is in a low power mode. When a terminal on the network wakes up and performs network searching, the Pico network maintains only the terminal in the CELL_DCH state because the SCH, CCPCH, PICH, AICH, and PRACH channels are in the disabled state. The terminal cannot camp on the Pico network even if it detects that a cell of the Pico network has good signal quality. Therefore, the terminal is only capable of camping on a normally operating Macro network that overlaps in coverage with the Pico network and initiating a service on the Macro network.

Step 4: When a data service volume of the terminal reaches a service volume threshold, the terminal sends a first service volume notification message to the RNC.

Step 5: The RNC determines whether the terminal is in the CELL_DCH state.

When receiving the first service volume notification message of the terminal, the RNC determines that the terminal has a service requirement on the Pico network and determines whether the terminal is in the CELL_DCH state.

The Pico network maintains only the terminal in the CELL_DCH state, and therefore only when the terminal has a service requirement on the micro network and the terminal is in the CELL_DCH state, the RNC sends a network handover instruction that includes configuration information of the Pico network to the terminal.

Step 6: If the terminal is in the non-CELL_DCH state, the RNC sends a second state transition instruction to the terminal to instruct the terminal to transit to the CELL_DCH state on the Macro network.

Step 7: When determining that the terminal is in the CELL_DCH state, the RNC sends a first measurement instruction to instruct the terminal to measure the signal quality of the Pico network.

Step 8: The terminal sends a first measurement report to the RNC to notify the RNC that the signal quality of the Pico network reaches a quality threshold.

The P-CPICH channel on the Pico network normally sends pilot information, and therefore measurement of the signal quality of the Pico network by the terminal is not affected.

In addition, in addition to the solution adopted in step 7 and step 8, the RNC may further periodically send a measurement instruction of measuring the signal quality of the Pico network to the terminal. When measuring that the signal quality of the Pico network reaches the quality threshold, the terminal sends a measurement report to the RNC, and the RNC determines whether to hand over the cell that the terminal camps on.

Step 9: The RNC sends the network handover instruction that includes the configuration information of the Pico network to the terminal to instruct the terminal to hand over from the CELL_DCH state on the Macro network to the CELL_DCH state on the Pico network so as to transmit a service.

Specifically, the RNC packs the configuration information (U-RNTI, RB information, radio access bearer (Radio Access Bearer, RAB for short) information, transport layer information, and physical layer information) of the Pico network and sends it to the terminal through a handover command (Handover command). The terminal initializes a signaling link, the radio bearer (Radio Bearer, RB for short) information, a transmission channel, and a physical channel according to Pico cell configuration in the handover command. The terminal executes, according to a received information element "maximum allowed uplink transmit power (Maximum allowed UL TX power)", an open loop evaluation to determine uplink link transmit power and hands over from the CELL_DCH state on the Macro network to the CELL_DCH state on the Pico network.

Step 10: The terminal hands over to the Pico network and performs high-rate data transmission on the Pico network.

Step 11: When the data service volume of the terminal is less than the service volume threshold, the terminal sends a second service volume notification message to the RNC to notify the RNC that the data service volume of the terminal is less than the service volume threshold.

After handing over to and camping on the Pico network, the terminal may measure its own service volume periodically, and when the service volume is less than a second service volume threshold, the terminal sends the second service volume notification message to the RNC.

Step 12a: The RNC sends a first state transition instruction to the terminal to instruct the terminal to transit from the CELL_DCH state to the non-CELL_DCH state.

After receiving the second service volume notification message, the RNC determines that the terminal has no service requirement on the Pico network. The RNC sends the first state transition instruction to the terminal to save radio resources of the Pico network.

Step 13a: The terminal transits from the CELL_DCH state to the non-CELL_DCH state.

For a terminal that has transited from the CELL_DCH state, the Pico network no longer maintains it. When the terminal needs to maintain its state on the Pico network and needs a service on the Pico network, because the Pico network is in the channel tailor mode, the terminal considers that a quality problem occurs on the Pico network, and triggers cell reselection to access the Macro network. For example, when the terminal reads a paging message periodically, because the PICH is disabled, the terminal cannot find the PICH channel, and therefore considers that the Pico network quality deteriorates, and triggers cell reselection.

In addition, after step 11, the RNC may also instruct the terminal to hand over from the Pico network to the Macro network for camping, which may be as follows:

Step 12b: The RNC sends the network handover instruction that includes the configuration information of the Macro network to the terminal to instruct the terminal to hand over from the Pico network to the Macro network for camping.

Specifically, the RNC sends a handover command for handing over to the Macro network to the terminal so as to instruct the terminal to hand over from the Pico network to the Macro network for camping.

Step 13b: The terminal hands over from the Pico network to the Macro network for camping.

After handing over from the Pico network to the Macro network, the terminal in the CELL_DCH state hands over to the Pico network again through step 4 to step 9 if the data service volume reaches the service volume threshold.

In the embodiment of the present invention, when a Pico network controlled by a macro base station is in the coverage area of a Macro network, all common physical channels or some common channels except a pilot channel on the Pico network are disabled to reduce transmission of broadcast signaling of the Pico network so as to reduce power consumption of the Pico network. In this way, the Pico network cannot support access of a terminal in a CELL_DCH state, the Macro network maintains the terminal in the non-CELL_DCH state, and the Pico network maintains only a terminal in a CELL_DCH state. The terminal accesses the Macro network during initial access. When a data service volume reaches a service volume threshold, an RNC allows the terminal to hand over to the CELL_DCH state, enter the CELL_DCH state of the Pico network so as to transmit a service, and perform high-rate data transmission on the Pico network. Further, when the data service volume of the terminal camping on the Pico network decreases, the RNC instructs the terminal to transit to the non-CELL_DCH state or instructs the terminal to hand over to the Macro network, so that the Pico network does not need to maintain a terminal with a less data service volume, thereby saving radio resources of the Pico network. All common physical channels except the pilot channel on the Pico network are disabled. This avoids overhead generated when the Pico network continuously transmits broadcast signaling, reduces power consumption of the Pico network, and reduces transmit power of the Pico network, so that interference between neighboring cells can be reduced and uplink and downlink capacity gains can be obtained. In addition, the Pico network is only capable of maintaining the terminal in the CELL_DCH state, thereby avoiding maintaining related signaling of a terminal in the non-CELL_DCH state and reducing unnecessary power waste.

Figure 4:
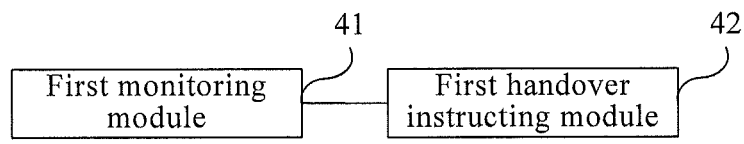
FIG. 4 is a schematic structural diagram of a network-side communications device according to an embodiment of the present invention.

FIG. 4 is a schematic structural diagram of a network-side communications device according to an embodiment of the present invention. As shown in FIG. 4, the network-side communications device in this embodiment includes a first monitoring module 41 and a first handover instructing module 42.

The first monitoring module 41 is configured to monitor whether a terminal on a macro network has a service requirement on a micro network, where the micro network is in the coverage area of the macro network, and all common physical channels or some common physical channels except a pilot channel on the micro network are in a disabled state.

The first handover instructing module 42 is configured to: if the first monitoring module 41 detects that the terminal has a service requirement on the micro network, send a network handover instruction that includes configuration information of the micro network to the terminal, where the network handover instruction is used to instruct the terminal to hand over from the macro network to the micro network.

An implementation manner is as follows: The first monitoring module 41 may be configured to monitor whether a data service volume of the terminal reaches a service volume threshold. The first handover instructing module 42 may be configured to: when the data service volume of the terminal reaches the service volume threshold, send the network handover instruction that includes the configuration information of the micro network to the terminal. For example, the first monitoring module may be configured to monitor whether the data service volume of the terminal reaches the service volume threshold, and the first handover instructing module may be configured to: when the data service volume of the terminal reaches the service volume threshold and the terminal is in a state of occupying a dedicated channel, send the network handover instruction that includes the configuration information of the micro network to the terminal.

Another implementation manner is as follows: The first monitoring module 41 may be configured to monitor whether a service volume notification message of the terminal is received, where the service volume notification message is used to notify that the data service volume of the terminal reaches the service volume threshold. The first handover instructing module 42 may be configured to: when the service volume notification message of the terminal is received, send the network handover instruction that includes the configuration information of the micro network to the terminal. For example, the first monitoring module 41 may be configured to monitor whether the service volume notification message of the terminal is received, where the service volume notification message is used to notify that the data service volume of the terminal reaches the service volume threshold. The first handover instructing module 42 may be configured to: when the service volume notification message of the terminal is received and the terminal is in a state of occupying a dedicated channel, send the network handover instruction that includes the configuration information of the micro network to the terminal.

Still another implementation manner is as follows: The first monitoring module 41 may be configured to monitor whether a network handover request exists in a service request of the terminal, where the network handover request is used to request a handover to the micro network. The first handover instructing module 42 may be configured to: when the service request of the terminal includes the network handover request, send the network handover instruction that includes the configuration information of the micro network to the terminal. For example, the first monitoring module 41 may be configured to monitor whether the network handover request exists in the service request of the terminal, where the network handover request is used to request a handover to the micro network. The first handover instructing module may be configured to: when the service request of the terminal includes the network handover request and the terminal is in a state of occupying a dedicated channel, send the network handover instruction that includes the configuration information of the micro network to the terminal.

The network-side communications device may be applied to the embodiments corresponding to FIG. 1 and FIG. 3A. For the network-side communications device, reference may be made to the network-side communications device on the macro network in the embodiments described in FIG. 1 and FIG. 3A, and therefore no further details are provided herein.

In the embodiment of the present invention, when a micro network exists in the coverage area of a macro network, all common physical channels or some common channels except a pilot channel on the micro network are disabled to reduce transmission of broadcast signaling on the micro network, so as to reduce power consumption of a capacity station. In this way, the capacity station cannot support access of a terminal. The terminal accesses the macro network during initial access. When the terminal has a service requirement on the micro network, the terminal is allowed to access the micro network, and the micro network provides a service for the terminal. Because all common physical channels or some common physical channels except the pilot channel on the micro network are disabled, the capacity station provides a high-rate service for the terminal only when the terminal has a service requirement, thereby avoiding a phenomenon that the terminal is maintained when the terminal has no service requirement, avoiding overhead generated because the capacity station continuously transmits broadcast signaling, reducing power consumption of the capacity station, and reducing transmit power of the capacity station.

Figure 5:
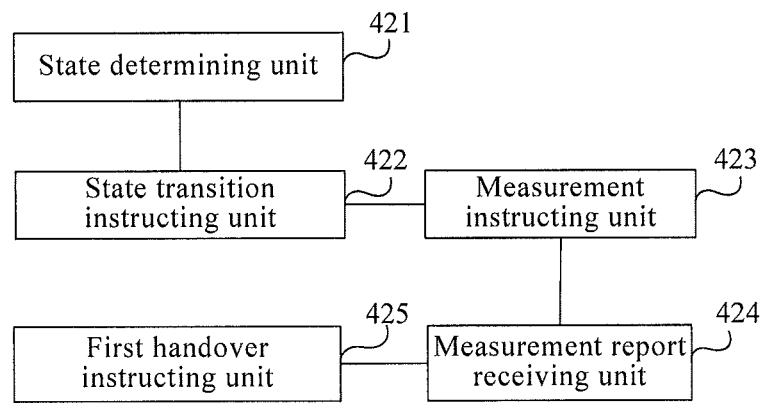
FIG. 5 is a schematic structural diagram of a first handover instructing module in FIG. 4.

FIG. 5 is a schematic structural diagram of a first handover instructing module in FIG. 4. As shown in FIG. 5, the first handover instructing module 42 includes: a state determining unit 421, a state transition instructing unit 422, a measurement instructing unit 423, a measurement report receiving unit 424, and a first handover instructing unit 425.

The state determining unit 421 is configured to: when the first monitoring module 41 detects that the terminal has a service requirement on a micro network, determine whether the terminal is in a state of occupying a dedicated channel.

The state transition instructing unit 422 is configured to: when the state determining unit 421 determines that the terminal is in a state of occupying no dedicated channel, send a state transition instruction to the terminal, where the state transition instruction is used to instruct the terminal to transit to the state of occupying a dedicated channel.

The measurement instructing unit 423 is configured to: when it is determined that the terminal is in the state of occupying a dedicated channel, send a measurement instruction to the terminal, where the measurement instruction is used to instruct the terminal to measure signal quality of the micro network.

The measurement report receiving unit 424 is configured to: after the measurement instructing unit 423 sends the measurement instruction to the terminal, receive a measurement report sent by the terminal, where the measurement report is used to notify that the signal quality of the micro network reaches a quality threshold.

The first handover instructing unit 425 is configured to: when the measurement report receiving unit 424 receives the measurement report sent by the terminal, send a network handover instruction that includes configuration information of the micro network to the terminal.

For the network-side communications device in the embodiment shown in FIG. 5, reference may be made to the network-side communications device on the macro network in the embodiment corresponding to FIG. 3A, and therefore no further details are provided herein.

In this embodiment, when a terminal is in a state of occupying a dedicated channel and the terminal measures that signal quality of a micro network reaches a quality threshold, a network-side communications device sends a network handover instruction to the terminal to instruct the terminal to hand over from a macro network to the micro network, so that the terminal occupying a dedicated channel performs a data processing service on the micro network.

Figure 6:
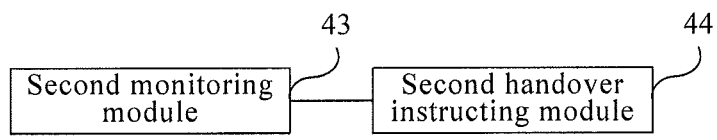
FIG. 6 is a schematic structural diagram of another network-side communications device according to an embodiment of the present invention.

FIG. 6 is a schematic structural diagram of another network-side communications device according to an embodiment of the present invention. As shown in FIG. 6, the network-side communications device in this embodiment includes a second monitoring module 43 and a second handover instructing module 44.

The second monitoring module 43 is configured to monitor whether a terminal on a micro network has a service requirement on the micro network, where the micro network is in the coverage area of a macro network, and all common physical channels or some common physical channels except a pilot channel on the micro network are in a disabled state.

The second handover instructing module 44 is configured to: if the second monitoring module 43 detects that the terminal has no service requirement on the micro network, send a network handover instruction to the terminal or send a state transition instruction to the terminal, where the network handover instruction is used to instruct the terminal to hand over to the macro network, and the state transition instruction is used to instruct the terminal to transit to a state of occupying no dedicated channel. Further, the second handover instructing module 44 may be further configured to: when the terminal has no service requirement on the micro network, send the state transition instruction to the terminal to instruct the terminal to transit from a state of occupying a dedicated channel to the state of occupying no dedicated channel.

An implementation manner is as follows: The second monitoring module 43 may be configured to monitor whether a data service volume of the terminal is less than a service volume threshold. The second handover instructing module 44 may be configured to: when the data service volume of the terminal is less than the service volume threshold, send the network handover instruction to the terminal or send the state transition instruction to the terminal.

Another implementation manner is as follows: The second monitoring module 43 may be configured to monitor whether a service volume notification message of the terminal is received, where the service volume notification message is used to notify that a service volume of the terminal is less than the service volume threshold. The second handover instructing module 44 may be configured to: when the service volume notification message of the terminal is received, send the network handover instruction to the terminal or send the state transition instruction to the terminal.

Still another implementation manner is as follows: The second monitoring module 43 may be configured to monitor whether a service request of the terminal carries a network handover request, where the network handover request is used to request a handover to the macro network. The second handover instructing module 44 may be configured to: when the service request of the terminal carries the network handover request, send the network handover instruction to the terminal or send the state transition instruction to the terminal.

The network-side communications device in this embodiment may be applied to the method in the embodiment shown in FIG. 2. For the network-side communications device, reference may be made to the network-side communications device on the macro network in the embodiment corresponding to FIG. 2, and therefore no further details are provided herein.

In the embodiment of the present invention, when a micro network exists in the coverage area of a macro network and a terminal camping on the micro network has no service requirement on the micro network, a network-side communications device instructs the terminal to hand over to the macro network, so that a capacity station does not need to maintain a terminal with a less data service volume, thereby saving radio resources of the capacity station and reducing unnecessary power waste.

Figure 7A:
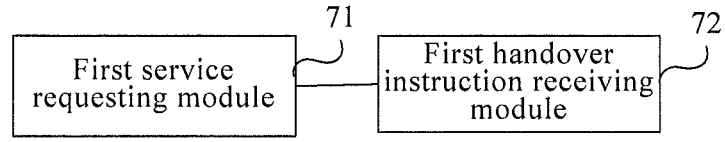
FIG. 7A is a schematic structural diagram of a terminal according to an embodiment of the present invention.

FIG. 7A is a schematic structural diagram of a terminal according to an embodiment of the present invention. As shown in FIG. 7A, the terminal in this embodiment includes a first service requesting module 71 and a first handover instruction receiving module 72.

The first service requesting module 71 is configured to send a service request on a macro network to a network-side communications device on the macro network, where a micro network exists in the coverage area of the macro network, and all common physical channels or some common physical channels except a pilot channel on the micro network are in a disabled state. The service request may include a network handover request, and the network handover request is used to request a handover to the micro network. When receiving the service request that includes the network handover request, the network-side communications device on the macro network determines that the terminal has a service requirement on the micro network.

The first handover instruction receiving module 72 is configured to: after the first service requesting module 71 sends the service request to the network-side communications device on the macro network and when the network-side communications device detects that the terminal has a service requirement on the micro network, receive a network handover instruction that includes configuration information of the micro network and is sent by the network-side communications device, where the network handover instruction is used to instruct the terminal to hand over from the macro network to the micro network.

Figure 7B:
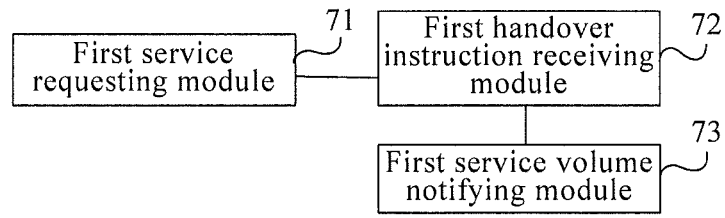
FIG. 7B is a schematic structural diagram of another terminal according to an embodiment of the present invention.

As shown in FIG. 7B, based on FIG. 7A, a terminal may further include a first service volume notifying module 73. The first service volume notifying module 73 is configured to: when the terminal camps on the macro network and detects that a data service volume reaches a service volume threshold, send a service volume notification message to a network-side communications device. After receiving the service volume notification message, the network-side communications device determines that the terminal has a service requirement on the micro network and sends the network handover instruction that includes the configuration information of the micro network by using a second handover instructing module.

The terminal in this embodiment may be applied to the method embodiments shown in FIG. 1 and FIG. 3A. For the terminal, reference may be made to the terminal in the embodiments corresponding to FIG. 1 and FIG. 3A, and therefore no further details are provided herein.

In the embodiment of the present invention, a terminal accesses a macro network and initiates a service on the macro network. When the terminal has a service requirement on a micro network, a network-side communications device on the macro network instructs the terminal to hand over from the macro network to the micro network, and the micro network provides a service for the terminal. All common physical channels except a pilot channel on the micro network are disabled, thereby avoiding overhead generated because the micro network continuously transmits broadcast signaling, reducing power consumption of a capacity station, and reducing transmit power of the capacity station.

Figure 8:
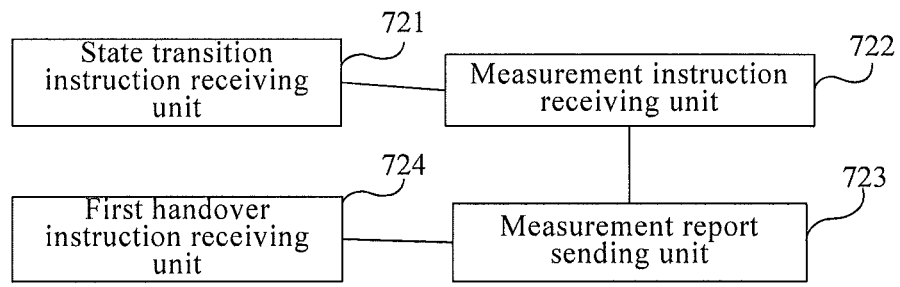
FIG. 8 is a schematic structural diagram of a first handover instruction receiving module in FIG. 7A.

FIG. 8 is a schematic structural diagram of a first handover instruction receiving module in FIG. 7A. As shown in FIG. 8, the first handover instruction receiving module 72 may include a state transition instruction receiving unit 721, a measurement instruction receiving unit 722, a measurement report sending unit 723, and a first handover instruction receiving unit 724.

The state transition instruction receiving unit 721 is configured to: when a terminal has a service requirement on a micro network and if the terminal is in a state of occupying no dedicated channel, receive a state transition instruction sent by the network-side communications device, where the state transition instruction is used to instruct the terminal to transit to a state of occupying a dedicated channel.

The measurement instruction receiving unit 722 is configured to: when the terminal is in the state of occupying a dedicated channel, receive a measurement instruction sent by the network-side communications device, where the measurement instruction is used to instruct the terminal to measure signal quality of a capacity station cell.

The measurement report sending unit 723 is configured to: after the measurement instruction receiving unit 722 receives the measurement instruction and when signal quality of the micro network reaches a quality threshold, send a measurement report to the network-side communications device, where the measurement report is used to notify that the signal quality of the micro network reaches the quality threshold.

The first handover instruction receiving unit 724 is configured to: after the measurement report sending unit 723 sends the measurement report to the network-side communications device and when the signal quality of the micro network reaches the quality threshold, receive a network handover instruction that includes configuration information of the micro network and is sent by the network-side communications device.

The terminal provided in this embodiment may be applied to the method embodiment shown in FIG. 3A. For the terminal, reference may be made to the terminal in the embodiment corresponding to FIG. 3A, and therefore no further details are provided herein.

In this embodiment, when a terminal is in a state of occupying a dedicated channel and the terminal measures that signal quality of a micro network reaches a quality threshold, the terminal receives a network handover instruction sent by a network-side communications device on a macro network, so that the terminal hands over from the macro network to the micro network and performs a data service on the micro network.

Figure 9A:
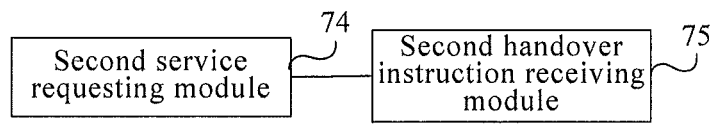
FIG. 9A is a schematic structural diagram of still another terminal according to an embodiment of the present invention.

FIG. 9A is a schematic structural diagram of still another terminal according to an embodiment of the present invention. As shown in FIG. 9A, the terminal provided in this embodiment includes a second service requesting module 74 and a second handover instruction receiving module 75.

The second service request module 74 is configured to send a service request on a micro network to a network-side communications device on a macro network, where the micro network is in the coverage area of the macro network, and all common physical channels or some common physical channels except a pilot channel on the micro network are in a disabled state. The service request may include a network handover request, and the network handover request is used to request a handover to the macro network.

The second handover instruction receiving module 75 is configured to: after the second service requesting module 74 sends the service request to the network-side communications device and when the network-side communications device detects that the terminal on the micro network has no service requirement on the micro network, receive a network handover instruction sent by the network-side communications device or receive a state transition instruction sent by the network-side communications device, where the network handover instruction is used to instruct the terminal to hand over to the macro network for camping, and the state transition instruction is used to instruct the terminal to transit from a state of occupying a dedicated channel to a state of occupying no dedicated channel.

Figure 9B:
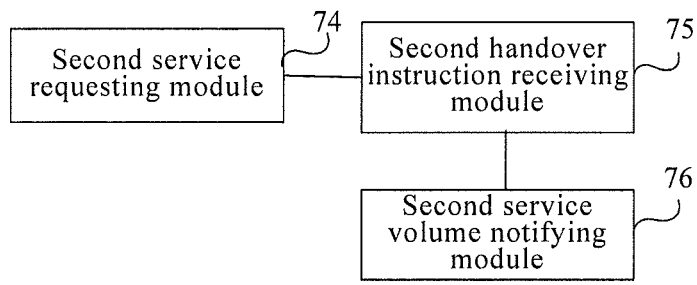
FIG. 9B is a schematic structural diagram of yet another terminal according to an embodiment of the present invention.

As shown in FIG. 9B, based on FIG. 9A, the terminal may further include a second service volume notifying module 76. The second service volume notifying module 76 is configured to: when the terminal camps on a micro network and detects that a data service volume is less than a service volume threshold, send a service volume notification message to the network-side communications device. After receiving the service volume notification message, the network-side communications device sends a network handover instruction that includes configuration information of the micro network by using the second handover instructing module.

The terminal provided in this embodiment may be applied to the method embodiment shown in FIG. 2. For the terminal, reference may be made to any one of the terminals in the embodiments corresponding to FIG. 2 and FIG. 3A, and therefore no further details are provided herein.

In this embodiment, when a terminal on a micro network has no service requirement on the micro network, the terminal receives a network handover instruction or a state transition instruction sent by a network-side communications device and hands over to a macro network, so that the micro network does not need to maintain the terminal that has no service requirement on the micro network.

In all embodiments of the present invention, the "module" and the "unit" may be logical entities or may be physical entities and may be implemented by using physical devices, such as a processor and a chip.

An embodiment of the present invention may further provide a communications system. The communications system may include the network-side communications device shown in any one of FIG. 4 and FIG. 5 and the terminal shown in any one of FIG. 7A, FIG. 7B, and FIG. 8, or the system may include the network-side communications device shown in FIG. 6 and the terminal shown in FIG. 9A or 9B.

Figure 10:
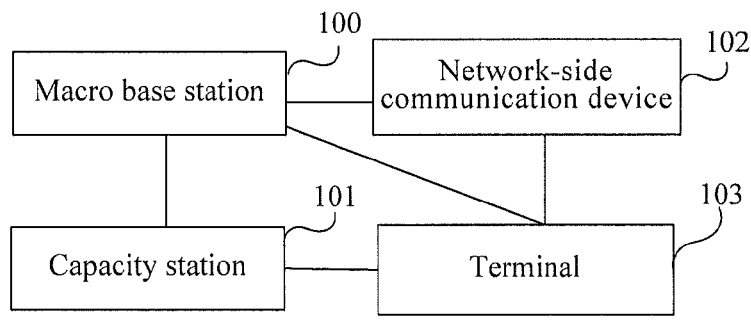
FIG. 10 is a schematic structural diagram of a communications system according to an embodiment of the present invention.

FIG. 10 is a schematic structural diagram of a communications system according to an embodiment of the present invention. As shown in FIG. 10, the system includes a macro base station 100, a capacity station 101, a network-side communications device 102, and a terminal 103. A micro network is in the coverage area of a macro network, and all common physical channels or some common physical channels except a pilot channel on the micro network are in a disabled state. The micro network is a network covered by the capacity station 101, and the macro network is a network covered by the macro base station. The network-side communications device 102 is a network-side device that is on the macro network and manages and controls the macro base station 100, and the network-side communications device 102 may be further integrated with the macro base station 100 in a hardware device.

The terminal 103 is configured to send a service request on the macro network to the network-side communications device 102 on the macro network.

The network-side communications device 102 is configured to monitor whether the terminal 103 on the macro network has a service requirement on the micro network, and when the terminal 103 has a service requirement on the micro network, send a network handover instruction that includes configuration information of the micro network to the terminal 103, where the network handover instruction is used to instruct the terminal 103 to hand over from the macro network to the micro network.

The terminal 103 is configured to hand over from the macro network to the micro network according to the network handover instruction that includes the configuration information of the micro network.

For the function implemented by each preceding network element, reference may be made to descriptions in the embodiments corresponding to FIG. 1 and FIG. 3A.

Alternatively, the terminal 103 may be configured to send the service request on the micro network to the network-side communications device 102.

The network-side communications device 102 is configured to monitor whether the terminal 103 on the micro network has a service requirement on the micro network, and when the terminal 103 has no service requirement on the micro network, send the network handover instruction to the terminal 103 or send a state transition instruction to the terminal 103, where the network handover instruction is used to instruct the terminal to hand over to the macro network, and the state transition instruction is used to instruct the terminal to transit to a state of occupying no dedicated channel.

The terminal 103 is configured to hand over from the micro network to the macro network according to the network handover instruction that includes configuration information of the macro network.

For the function implemented by each preceding network element, reference may be made to descriptions in the embodiments corresponding to FIG. 2 and FIG. 3A.

Figure 11:
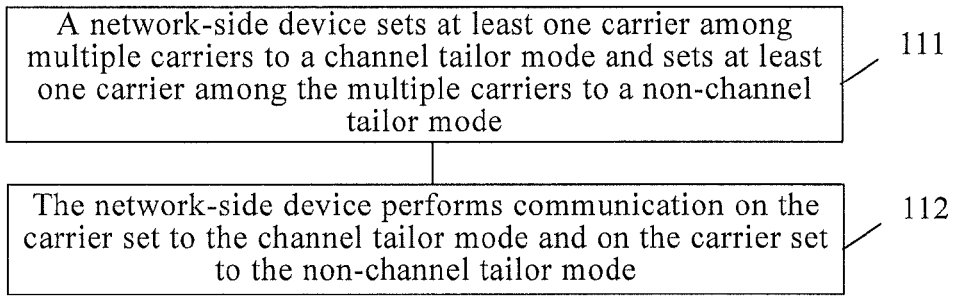
FIG. 11 is a schematic flowchart of another communications method according to an embodiment of the present invention.

As shown in FIG. 11, the present invention provides another communications method, including:

Step 111: A network-side device sets at least one carrier among multiple carriers to a channel tailor mode and sets at least one carrier among the multiple carriers to a non-channel tailor mode.

Step 112: The network-side device performs communication on the carrier set to the channel tailor mode and on the carrier set to the non-channel tailor mode.

The method may further include:

receiving, by the network-side device, a handover instruction, where the handover instruction instructs a terminal to hand over to the carrier set to the channel tailor mode; and enabling, by the network-side device, the disabled some or all common physical channels to perform a handover.

Optionally, after the handover is complete or after a timer expires, the network-side device may set all common physical channels or some common physical channels of the carrier to a disabled state.

In the method provided in the embodiment of the present invention, on a multi-carrier network, such as a UMTS, an LTE, or an LTE-A multi-carrier network, at least one carrier among multiple carriers is set to a non-channel tailor mode, where the non-channel tailor mode is that all channels are in a complete state, no channel is in a disabled state, and all common channels are in an enabled state. At least one carrier among the multiple carriers is in the channel tailor mode, which means that all common channels or some common channels except a pilot channel are in the disabled state. For the channel tailor mode of the carrier, reference may be made to the description of the channel tailor mode in the preceding embodiments of the present invention.

In the embodiment of the present invention, in an initial state, all carriers on the multi-carrier network may be transmitted while maintaining complete common channel, that is, all carriers are in non-channel tailor mode. In the operating process of a system, at least one carrier may be set to the channel tailor mode according to system load, the number of users in an activated state, the number of users in an idle state, and the like. For example, when the system load is less than a preset threshold, the number of users in the activated state is less than a preset number, or the number of users in the idle state is greater than a preset number, or the like, some or all common channels may be disabled. For example, on a UMTS multi-carrier network, all or some common channels on carriers may be disabled according to system load, the number of users in an FACH state, or the number of users in a PCH state. Further, in this embodiment, when one carrier is set to the channel tailor mode, the disabled some or all common channels may be enabled according to the system load, the number of users in the activated state, the number of users in the idle state, and other information. All disabled common channels may be enabled or some disabled common channels may be enabled. For example, when the system load increases, the number of users in the activated state increases, or the number of users in the idle state increases, some or all disabled common channels may be enabled.

In this embodiment, when the terminal needs to hand over to the carrier in the channel tailor mode, for example, the base station receives a handover instruction that requires the terminal to hand over to the carrier in the channel tailor mode, some or all disabled common channels may be enabled, that is, the base station may send complete common channels or some common channels. For example, when a terminal on a neighboring carrier on a neighboring base station needs to hand over to the carrier in the channel tailor mode, or the terminal needs to hand over from a neighboring carrier on the current base station to the carrier in the channel tailor mode, the base station is capable of transmitting complete common channels on the carrier in the channel tailor mode or at least transmitting a primary common physical control channel (primary-common physical control channel, P-CPCCH) and an SCH. In this embodiment, optionally, after the terminal completes the handover, the carrier may be reset to the channel tailor mode. For example, the some or all common channels enabled during the handover may be disabled or the carrier may be set to the channel tailor mode according to the system load, the number of users in the activated state, the number of users in the idle state, or the like. Or, a timer maybe set, where the timer may be triggered when a common channel in the disabled state originally is enabled. When the timer expires, the enabled common channels are disabled again.

Figure 12:
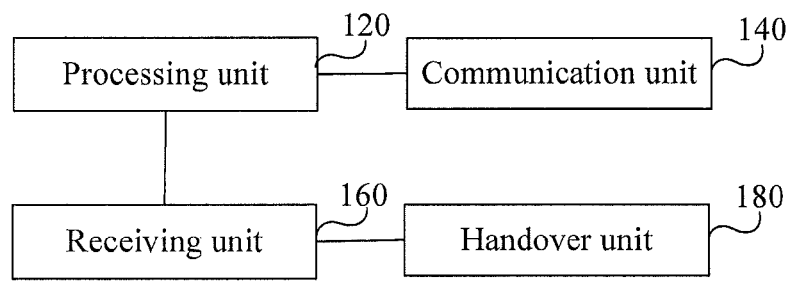
FIG. 12 is a schematic structural diagram of another base station according to an embodiment of the present invention.

As shown in FIG. 12, the present invention further provides a base station, where the base station may include:

a processing unit 120, configured to set at least one carrier among multiple carriers to a channel tailor mode and set at least one carrier among the multiple carriers to a non-channel tailor mode; and a communication unit 140, configured to perform communication on the carrier set to the channel tailor mode and on the carrier set to the non-channel tailor mode.

Further, the base station may further include: a receiving unit 160, configured to receive a handover instruction, where the handover instruction instructs a terminal to hand over to the carrier set to the channel tailor mode; and a handover unit 180, configured to enable disabled some or all common physical channels to perform a handover. Optionally, the processing unit 120 may be further configured to: after the handover is complete or after a timer expires, the network-side device may set all common physical channels or some common physical channels of the carrier to a disabled state.

The base station provided in the embodiment of the present invention may implement the communications method provided in FIG. 11.

Persons of ordinary skill in the art may understand that, all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various media capable of storing program codes, such as a ROM, a RAM, a magnetic disk or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of the corresponding technical solutions to depart from the spirit and scope of the technical solutions of the embodiments of the present invention.

What is claimed is:

1. A communications device, comprising:
   a processor, configured to monitor whether a terminal on a macro network has a service requirement on a micro network controlled by the macro network, wherein the micro network is in the coverage area of the macro network, and the micro network is in a channel tailor mode whereby all common physical channels on the micro network or some common physical channels on the micro network except a pilot channel on the micro network are in a disabled state so that the micro network is disabled from supporting initial access of the terminal and enabled to accept access of the terminal by handover from the macro network which controls the micro network; and a transmitter, configured to: when the terminal has a service requirement on the micro network, send a first network handover instruction that comprises configuration information of the micro network controlled by the macro network to the terminal, wherein the first network handover instruction is used to instruct the terminal to hand over from the macro network to the micro network, wherein:

the processor is further configured to monitor whether a data service volume of the terminal reaches a service volume threshold, and confirm the service requirement on the micro network when the data service volume reaches the service volume threshold; and the transmitter is further configured to: when the data service volume of the terminal reaches the service volume threshold, send the first network handover instruction that comprises the configuration information of the micro network to the terminal.

2. The device according to claim 1, further comprising:
a receiver, configured to receive a first service volume notification message from the terminal, wherein the first service volume notification message is used to notify that a data service volume of the terminal reaches a service volume threshold, and thereby indicate that the terminal has a service requirement on the micro network, wherein:

the processor is further configured to monitor whether the first service volume notification message is received; and the transmitter is further configured to: when the first service volume notification message is received, send the first network handover instruction that comprises the configuration information of the micro network to the terminal.

3. The device according to claim 1, further comprising:
a receiver, configured to receive a first service request from the terminal, wherein:

the processor is further configured to monitor whether a first network handover request exists in the first service request, wherein the first network handover request is used to request a handover to the micro network; and the transmitter is further configured to: when the first service request comprises the first network handover request, send the first network handover instruction that comprises the configuration information of the micro network to the terminal.

4. The device according to claim 1, wherein the processor is configured to enable some or all of disabled common physical channels on the micro network, wherein the disabled common physical channels are in the disabled state.

5. A communications device, comprising:
a processor, configured to monitor whether a terminal on a micro network has a service requirement on the micro network controlled by a macro network, wherein the micro network is in the coverage area of the macro network, and all common physical channels or some common physical channels except a pilot channel on the micro network are in a disabled state so that the micro network is in a channel tailor mode whereby the micro network is disabled from supporting initial access of the terminal and enabled to accept access of the terminal by handover from the macro network which controls the micro network; and a transmitter, configured to: when the terminal has no service requirement on the micro network, send a second network handover instruction to the terminal or send a state transition instruction to the terminal, wherein the second network handover instruction is used to instruct the terminal to hand over to the macro network, and the state transition instruction is used to instruct the terminal to transit to a state of occupying no dedicated channel, wherein:

the processor is further configured to monitor whether a data service volume of the terminal is less than a service volume threshold, and confirm the service requirement on the micro network when the data service volume reaches the service volume threshold; and the transmitter is further configured to: when the data service volume of the terminal is less than the service volume threshold, send the second network handover instruction to the terminal or send the state transition instruction to the terminal.

6. The device according to claim 5, further comprising:
a receiver, configured to receive a second service volume notification message from the terminal, wherein the second service volume notification message is used to notify that a data service volume of the terminal is less than a service volume threshold, and thereby indicate that the terminal has a service requirement on the micro network, wherein:

the processor is further configured to monitor whether the second service volume notification message is received, and the transmitter is further configured to: when the second service volume notification message of the terminal is received, send the second network handover instruction to the terminal or send the state transition instruction to the terminal.

7. The device according to claim 5, further comprising:
a receiver, configured to receive a second service request from the terminal, wherein:

the processor is further configured to monitor whether the second service request carries a second network handover request, wherein the second network handover request is used to request a handover to the macro network, and the transmitter is further configured to: when the second service request carries the second network handover request, send the second network handover instruction to the terminal or send the state transition instruction to the terminal.

8. The device according to claim 5, wherein the processor is configured to disable some or all of enabled common physical channels on the micro network, wherein the enabled common physical channels are in the enabled state.

9. A terminal, comprising:
a transmitter, configured to
send a first service request to a communications device on the macro network, wherein the terminal is camping on a macro network, and a micro network controlled by the macro network is in the coverage area of the macro network, and all common physical channels or some common physical channels except a pilot channel on the micro network are in a disabled state so that the micro network is in a channel tailor mode whereby the micro network is disabled from supporting initial access of the terminal and enabled to accept access of the terminal by handover from the macro network which controls the micro network; and
send a message related to a data service volume of the terminal to the communications device; and a receiver, configured to: when the communications device detects that the terminal has a service requirement on the micro network by monitoring and confirming that the data service volume reaches a service volume threshold, receive a first network handover instruction sent by the communications device in response to the detecting the terminal has the service requirement on the micro network, the first network handover instruction comprising configuration information of the micro network and is sent by the communications device, wherein the first network handover instruction is used to instruct the terminal to hand over from the macro network to the micro network.

10. The terminal according to claim 9, wherein:
the first service request comprises a first network handover request, and the first network handover request is used to request a handover to the micro network.

11. The terminal according to claim 9, wherein:
the transmitter is further configured to send a first service volume notification message to the communications device, and
the first service volume notification message is used to notify that a data service volume of the terminal reaches a service volume threshold.

12. The terminal according to claim 9, wherein:
the receiver is further configured to: when the terminal has a service requirement on the micro network and the terminal is in a state of occupying no dedicated channel, receive a first state transition instruction from the communications device, wherein the first state transition instruction is used to instruct the terminal to transit to a state of occupying a dedicated channel; and
the receiver is further configured to: when the terminal is in the state of occupying a dedicated channel, receive a measurement instruction from the communications device, wherein the measurement instruction is used to instruct the terminal to measure signal quality of the micro network; and
the transmitter is further configured to send a measurement report to the communications device when signal quality of the micro network reaches a quality threshold, wherein the measurement report is used to notify the communications device that the signal quality of the micro network reaches the quality threshold; and
the receiver is further configured to: when the signal quality of the micro network reaches the quality threshold, receive the first network handover instruction from the communications device.

13. The terminal according to claim 9, wherein:
the receiver is configured to: after the terminal handing over to the micro network, and the communications device detects that the terminal has no service requirement on the micro network, receive a second network handover instruction from the communications device or receive a second state transition instruction from the communications device, and
the second network handover instruction is used to instruct the terminal to hand over to the macro network for camping, and the second state transition instruction is used to instruct the terminal to transit from a state of occupying a dedicated channel to a state of occupying no dedicated channel.

* * * * *